United States Patent [19]

Hethuin et al.

[11] Patent Number: 5,999,118
[45] Date of Patent: Dec. 7, 1999

[54] METHOD OF SPECTRAL ANALYSIS, FM/CW TYPE RADIO ALTIMETER WITH DIGITAL PROCESSING

[75] Inventors: Serge Hethuin, Courbevoie; Gilles Bourde, Issy les Moulineaux, both of France

[73] Assignee: Thomson-CSF, Paris, France

[21] Appl. No.: 08/887,938

[22] Filed: Jul. 3, 1997

[30] Foreign Application Priority Data

Jul. 5, 1996 [FR] France .................................. 96 08391

[51] Int. Cl.$^6$ ....................................................... G01S 13/34
[52] U.S. Cl. ............................................................. 342/122
[58] Field of Search .................................. 342/122, 128, 342/192, 195, 196, 145; 701/4

[56] References Cited

U.S. PATENT DOCUMENTS

| | | | |
|---|---|---|---|
| 4,636,958 | 1/1987 | Hethuin et al. | 342/399 |
| 4,728,957 | 3/1988 | Hethuin | 342/401 |
| 4,766,436 | 8/1988 | Crepin et al. | 342/122 |
| 4,947,354 | 8/1990 | Hethuin | 342/122 |
| 5,032,840 | 7/1991 | Hethuin | 342/175 |
| 5,072,223 | 12/1991 | Hethuin et al. | 342/122 |
| 5,458,122 | 10/1995 | Hethuin . | |

FOREIGN PATENT DOCUMENTS 2 650 413  2/1991  France .

*Primary Examiner*—Daniel T. Pihulic
*Attorney, Agent, or Firm*—Oblon, Spivak, McClelland, Maier & Neustadt, P.C.

[57] ABSTRACT

A spectral analysis carried out on the beat signals obtained by the mixing of a transmission signal, the frequency of which is modulated in the form of recurrent sawteeth, with this same signal after it has been transmitted, reflected and then received. The spectral analysis is based on the computation of self-correlation coefficients enabling the definition of the spectral components. For this purpose, the coefficients are computed at each sawtooth and are combined with the coefficients determined with the most recent previous sawteeth to give so-called global coefficients, from which the spectral components sought are restituted in a conventional way. Application especially to altimeters for the measurement of small heights.

8 Claims, 1 Drawing Sheet

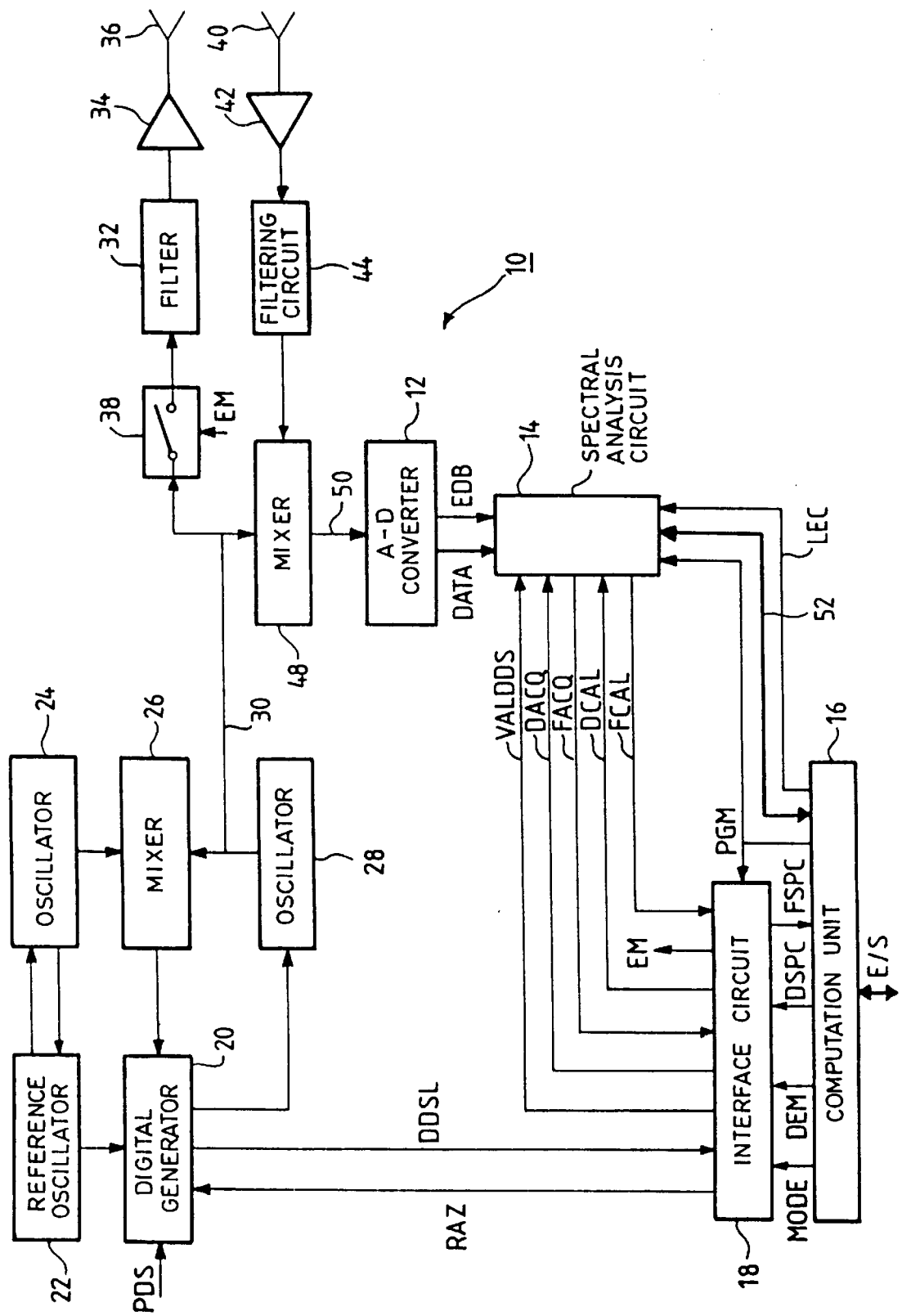

METHOD OF SPECTRAL ANALYSIS, FM/CW TYPE RADIO ALTIMETER WITH DIGITAL PROCESSING

BACKGROUND OF THE INVENTION

The invention relates to a method of spectral analysis, especially for a digital processing FM/CW type radio altimeter.

In these altimeters, a recurrent signal modulated in a linear ramp of frequency, known as a sawtooth frequency, is transmitted towards the ground. After reflection on the ground, the received signal is mixed with the transmitted signal. The frequency difference between the two signals, namely the beat frequency, is directly proportional to the propagation time (hence to the height) and to the slope of the frequency ramp.

Given the complexity of the phenomenon of reflection and the many back-scattered reflections that are picked up, it is actually a set of offset signals with different amplitudes and frequencies that is received. The received signal is therefore in fact a composite signal, and it is on the basis of the spectrum of the beat signal that the flying height can be determined.

The invention can be applied to the spectral analysis of the beat signal in a radio altimeter of this type, but nevertheless is not limited to this particular application.

This spectral analysis is presently achieved by digital means that give greater precision, improved discrimination of the echoes received, etc. To enable the processing of this signal, the beat signal is sampled in a known way.

A particular difficulty arises however in the case of low flying heights. Indeed, to keep the beat signal in a frequency band limited to a few hundreds of kilohertz and therefore avoid an excessively great dynamic range that would make it difficult to obtain a uniform analysis of the signal, the period of the sawteeth is subjected to a control loop related to the flying height. For a height varying from a few feet to 60,000 feet approximately, the period of the sawteeth varies from approximately 64 $\mu$s to 100 ms, giving a dynamic range of about $10^4$, so as to keep either a constant beat frequency of 25 kHz or 100 kHz or a frequency contained within very narrow limits, for example between 60 kHz and 100 kHz. In the latter case, if the beat frequency tends to go out of this zone, it is brought back by the control loop.

For major heights, several hundreds of thousands of samples are available per sawtooth, owing to the fact that a high sampling frequency, generally equal to 256 kHz, is used. Several known methods of spectral analysis may be applied satisfactorily to obtain the desired result: these are the Fast Fourier Transform, the Fourier Transform of a self-correlation function or again other parametrical methods of the least error squares type using algorithms such as Burg's algorithm applied directly to the samples or Levinson's algorithm applied to self-correlation coefficients.

By contrast, for the small heights, the number of samples becomes very small: at most, for a 64 $\mu$s sawtooth and a sampling frequency of 256 kHz, it is about 16 samples in theory. In practice, it is even smaller, in the range of 10 useful samples at most, and indeed several samples are lost owing to the delay given by the echo.

To cope with this difficulty, a different method of spectral analysis may be used for the small heights. This method is generally based on adaptive estimation methods such as the method of the gradient or the recursive least error squares method which assesses linear prediction coefficients that are re-estimated at each sample. This procedure however suffers from low reliability when the signal-to-noise ratio is small and does not accept breaks in phase between two successive sawteeth, namely between the last sample of one sawtooth and the first sample of the next sawtooth.

The French patent FR-A-2 650 413 describes a circuit implementing the various methods of spectral analysis mentioned here above with a system enabling the selection, at request, of a method of analysis such as the discrete Fourier transform, the gradient method or the Levinson method and the parameters for the implementation of the method selected.

This approach, while it enables the choice of a method more appropriate to spectral analysis in the case of small heights, does not however overcome the drawbacks inherent in this method, especially its unsatisfactory behavior in the presence of a poor signal-to-noise ratio.

SUMMARY OF THE INVENTION

The invention is aimed at proposing a new method of spectral analysis that can be used to prevent or at least reduce the various drawbacks resulting from the small number of samples available in the case of very short ramps.

This is obtained by the method that consists in:

basing the spectral analysis on the computation of self-correlation coefficients to obtain satisfactory behavior even in the presence of a poor signal-to-noise ratio, limiting the number of self-correlation coefficients to be computed, to enable the performance of this computation on one and the same sawtooth, even if it is a very short one, which then implies the extraction of the linear prediction coefficients by a least error squares method from the self-correlation coefficients, using a mean that enables the computation of the self-correlation coefficients on a longer duration than that of the short sawteeth, for the consistency of the estimator of the self-correlation function is obtained only if the length of integration is sufficiently large.

To do this, the self-correlation coefficients are computed locally on one and the same sawtooth and combined with coefficients computed on the preceding sawteeth, so as to give self-correlation coefficients known as <global> self-correlation coefficients from which there are extracted, in a method known per se, linear prediction coefficients enabling the restitution of the desired spectral components; so that the previous values of the local coefficients are not indefinitely stored, there is provided an exponential <weighting factor> mechanism that can be parametrized and is proportional to the periods of the sawteeth in use at the time of computation.

Thus, according to the present invention, there is provided a method of spectral analysis, especially for a digital processing FM/CW type radio altimeter, comprising successive steps as follows:

a) the frequency modulation of a transmission signal according to a law of variation in sawtooth form at a given recurrence frequency, b) the transmission of this modulated signal, and its reception after reflection and the mixing of the received signal with the transmitted signal so as to give a beat signal, c) the digitizing of this beat signal so as to give a succession of digital samples of signals delivered during the period of each sawtooth, and d) the performance of a spectral analysis of these samples in order to deliver a spectral information element, this spectral analysis comprising the following steps:

e) the determining, at each sawtooth, of a series of local self-correlation coefficients enabling the definition of spectral components, on the basis of signal samples that are current, namely received during this same sawtooth, f) the determining of a series of global self-correlation coefficients by the computation of a weighted sum of the current local self-correlation coefficients and of the prior global self-correlation coefficients, computed during the previous sawteeth, g) the determining, from the global self-correlation coefficients, of a series of coefficients of a predictive polynomial by one of the two methods respectively known as the least error squares method and the Fourier transform, h) the restitution of the spectral components from the series of coefficients of a prediction polynomial thus determined.

BRIEF DESCRIPTION OF THE DRAWING

The present invention will be understood more clearly and other features shall appear from the following description and from the appended single figure which shows a block diagram of the various circuits of a radio altimeter capable of implementing the method of the invention.

MORE DETAILED DESCRIPTION

In the figure, reference 10 designates the various analog circuits for the transmission/reception of the modulated signal. This modulated signal, after reception, is digitized by an analog-digital converter 12 to give a series of digital samples DATA. This series of digital signals DATA is applied to a spectral analysis circuit 14, at the end of digitization, at the same time as an activation signal EDB (<echantillons disponibles> in the French, meaning "available samples") which is a signal based on a sampling clock signal. The digitization is done at a sampling frequency of 256 kHz with samples represented on 8 bits in the described example, and possibly on 10, 12, 14 bits.

The spectral analysis circuit 14 works with a computation unit 16 in a management processor type 16-bit digital architecture which, in the example described, is a 68340 type component. This may also be a signal processor, for example a TMS 320C30 component carrying out a sequenced software program. An interface circuit 18 fulfills a control interface function between the spectral analysis circuit 14 and the computation unit 16, especially to implement two different modes of transmission, namely continuous mode or discontinuous mode.

The analog circuits 10 comprise a digital generator 20 driven by a reference oscillator 22 with a frequency of 1.05 GHz in the example described. The parameters of this digital generator 20 are set by sawtooth slope information (PDS) and resetting information (RAZ) to synchronize the beginning of the sawtooth. This information RAZ is produced by the interface circuit 18. An oscillator 24 is subjected to a control loop by the oscillator 22. This oscillator 24 is a voltage controlled oscillator. It delivers a fixed frequency of 4.2 GHz at the first input of a mixer 26 which receives, at its second input, a signal from a VCO type oscillator 28. The mixer 26 gives the digital generator 20 a signal whose frequency corresponds to the difference between the frequencies of the oscillators 24 and 28. The digital generator 20, using the RAZ and PDS information elements, produces frequency ramps in digital form. The oscillator 28 is voltage-controlled by an error signal coming from the digital generator 20 in such a way that the output voltage from the mixer 26 is the analog copy of the voltage generated in the form of digital frequency ramps by the generator 20. In the example described, the oscillator 28 thus gives a frequency ramp that varies from 4.3 to 4.4 GHz, and the mixer gives a frequency ramp that varies from 4.3–4.2 GHz=100 MHz to 4.4–4.2 GHz=200 MHz. The output signal at 4.3–4.4 GHz in the form of a linear ramp produced by this oscillator 28 is applied through a line 30 to a filter 32 followed by a power amplifier 34 and a transmission antenna 36. For a discontinuous transmission, a switch 38 is controlled by a signal EM produced by the interface circuit 18.

The reception circuit has an antenna 40, a low-noise amplifier 42 and a filtering circuit 44. The received signal is applied to one input of a mixer 48 receiving, at another input, the transmission signal thus giving the beat signal mentioned here above at 50. This beat signal is applied, through the analog-digital converter 12, to the spectral analysis circuit 14.

The synchronization of the entire unit is provided by the various control signals received or sent by the digital circuits 14, 16, 18. Thus, the circuit 18 receives a <logic sawtooth> DDSL during the period of the production of the sawtooth to inhibit the circuits during the break in phase between two consecutive sawteeth, and sends a signal VALDDS, indicating the validity of the samples, towards the spectral analysis signal 14. This is a square-wave signal that either corresponds to the generation of the ramp minus the number of samples during the to-and-fro transit time between the ground and the aircraft, hence to the passage into transmission mode, or corresponds to radio silence. This signal VALDDS is prepared essentially by a means of the signal DDSL and it is used by the spectral analysis circuit 14 to ascertain the validity of the signal, namely to eliminate the signal samples between two successive ramps.

The interface circuit 18 also sends acquisition request and computation request signals DACQ and DCAL to the circuit 14 and receives signals FACQ and FCAL from this circuit 14, indicating that the performance of these requests has been completed.

From the computation unit 16, the interface circuit 18 receives a signal MODE, a discontinuous mode transmission request signal DEM, a spectrum computation request signal DSPC, for the piloting of the circuit 20, and returns a signal FSPC to the computation unit 16 indicating the availability of the spectrum once the computation of this spectrum has been completed by the circuit 14. The signal MODE points out, with the transmission being done continuously or discontinuously, the mode of operation is in continuous or discontinuous processing mode.

The computation unit 16 may then use the bus 52 to read the results of the spectral analysis produced by the circuit 14. This result is controlled by the signal LEC.

Finally, the type of method analyzed may be selected, at the request of the computation unit 16, by a programming signal PGM delivered to the spectral analysis circuit 14 and the interface circuit 18.

The spectrum read by the computation unit 16 could be analyzed by a known extraction software program, the information on height being then delivered by an input/output bus I/O.

In the continuous processing mode of operation, the transmission of the radio signal being continuous, the system has the entire time available to carry out its processing operations.

The computation unit 16 prompts the start of a sequence of processing operations related to the beginning of a new modulation ramp. The circuit 18 then produces a signal RAZ for the resetting of the generator 20, activates the passage into transmission mode and transmits the command to begin processing (DACQ) to the spectral analysis circuit 14.

The samples are obtained and the self-correlation coefficients $R_0, \ldots, R_M$ are computed in a manner known per se. It is enough to refer to the patent FR-A-2 650 413 mentioned here above for this aspect of the computation as well as for other aspects of the computation.

A first possibility, especially if the ramp is long enough, consists in carrying out the spectral analysis permanently, in reiterating this analysis and delivering a plurality of successive results until the end of the sawtooth. The availability of the results is reported to the circuit 18 by the signal FCAL indicating the end of spectrum computation. This signal is transmitted to the computation unit 16 by the end of spectrum signal FSPC. This procedure is used to increase the rate of output of spectra to the maximum for certain methods of analysis.

In the second possibility, the spectral analysis resource is activated only at the request of the computation unit 16. In this case, the unit 16 produces a spectrum computation request DSPC at the interface circuit 18, when it necessitates a spectral estimation, generally in a regular way. This spectrum computation request DSPC is transmitted to the control interface 18 which, in turn, by means of the signal DCAL informs the spectral analysis circuit 14. This circuit 14 will transmit the signal FCAL when the results are available.

It is this possibility that will be used in the particular case of the invention which can be applied to short sawteeth and provides for the computation of the <global> self-correlation coefficients on the basis of samples relating not only to one sawtooth but also to prior sawteeth.

It must be noted that in any case, for the computation of a local coefficient, it is only the samples belonging to one sawtooth that are taken into account, those corresponding to breaks between two sawteeth being eliminated, so as to get rid of breaks in phase between successive sawteeth.

Between two operations to activate processing sequences, the spectral analysis circuit 14 provides for the management of its internal resources independently, apart from the option of requests for spectra by the microprocessor.

To implement the invention, the self-correlation coefficients $R_0, \ldots, R_M$ are computed as indicated further above. These coefficients are called "local" because they relate to only one and the same sawtooth. The patent FR-A-2 586 312 gives a detailed description of the way to obtain these self-correlation coefficients.

These local coefficients are computed systematically for each of the sawteeth received.

After having thus defined a plurality, generally of 2 to 32, of local self-correlation coefficients, the local coefficients corresponding to the last sawtooth received are combined linearly with those corresponding to the previous sawteeth, weighted by a "weighting factor", namely a factor enabling a smaller weight to be given to the oldest prior local coefficients.

From this linear combination, there are deduced a series of self-correlation coefficients qualified as "global" coefficients:

$$R_{0g}(n) = R_0(n) + \lambda_{n-1} R_{0g}(n-1) + \ldots$$

$$R_{Mg}(n) = R_M(n) + \lambda_{n-1} R_{Mg}(n-1) + \ldots$$

with, to the left of the equal signs, the global coefficients derived from the nth sawtooth and, to the right, in the following order, the local coefficients of the $n^{th}$ sawtooth, then the global coefficients coming from the $(n-1)^{th}$ sawtooth, assigned a weight $\lambda_{n-1}$ and, not written, the coefficients with their weights, pertaining to the oldest sawteeth: $(n-2)^{th}, \ldots$ Thus, these "global" self-correlation coefficients relate to a plurality of sawteeth and the self-correlation therefore extends beyond a sawtooth, unlike in the prior art methods where the self-correlation was limited to one and the same ramp as in the case of the above-mentioned patents FR-A-2 586 312 and FR-A-2 650 413.

This method of recursive self-correlation may be described schematically as regards the computation of the global self-correlation coefficients, by the following algorithm presented in meta-language:

Fixing the initial parameters:
   ORDER=number from 2 to 32
   WEIGHTING FACTOR=value $2^{-M}$
   with M chosen between 11 and 16
Resetting:

```
For k = 0 to ORDER:
{
    R_global[k] = 0
    R_local[k] = 0
}
CPT = 0
```

"Loop":
   For each sample $x_i$ (i = 0 to N - 1) of the ramp j:

```
{
    For k = 0 to min (i,ORDER)
        R_local[k] = R_local[k] + x_i * x_{i-k}
    CPT = CPT + 1
}
At the end of the ramp j:
{
    For k = 0 to ORDER:
    {
        R_global[k] = R_global[k](1 - CPT*WEIGHTING
        FACTOR) + R_local[k]
        R_local = 0
    }
    CPT = 0
}
```

Wait for a new ramp:
   For each sampling clock stroke:

$CPT = CPT+1$

At the arrival of a new ramp, loop back to LOOP.

Once the global coefficients have thus been obtained, a global estimation method based on linear prediction coefficients is applied to them, for example the Levinson method and more generally a least error squares method or again a Fourier transform of these self-correlation coefficients, to obtain a series of linear prediction coefficients $A_i$ that will enable the restitution of the spectral components of the signal studied.

These steps for the determining of the coefficients for the prediction and restitution of the spectral components are known per se with the essential difference that, in the prior art methods, they were applied either to the samples themselves or to local self-correlation coefficients whereas in the present invention they are applied to the global self-correlation coefficients as defined herein.

It must be noted that the spectral analysis circuit 14 can use the self-correlation coefficients computed at any time, whether during the reception of a ramp or during the interval of time between two ramps, the device then picking up all the values of $R_{global}(k)$.

Furthermore, in a manner in which the parameters can be set by the user, after the values of $R_{global}(k)$ have been determined, the system may choose to reset these coefficients or else leave them unchanged. These possibilities are used for example after resetting or during long sawteeth.

With respect to the exponential weighting factor parameter $\lambda$ which relates the coefficients computed locally on a ramp with the global coefficients, these parameters are likened to the WEIGHTING FACTOR variable as follows: $\lambda=(1-\text{WEIGHTING FACTOR})$ is the "weighting factor" value for each sample with respect to the next one, and therefore $\lambda^N=(1-\text{WEIGHTING FACTOR})^N$ is the "weighting factor" value pertaining to the N past samples. In taking WEIGHTING FACTOR=$\frac{1}{2}^M$, with M relatively great before unity, we get: $\lambda^N=1-(\frac{1}{2}^M)^N \approx 1-N\,2^{-M}$. This gives, for typical values of M ranging from 11 to 16, a weighting factor for 1024 samples respectively ranging from 0.5 to 0.985.

The discontinuous processing mode of operation is suitable for optimizing the discretion of the equipment or sharing the frequency band with other systems.

An isolated signal is transmitted: the circuit acquires the data to perform the algorithm and releases the transmission resources. To carry out a new processing operation, the computation unit 16 must repeat a request for transmission by the signal DEM. It must be noted that the ramp generator is not necessarily reset at each request. The control interface 18 can manage the periodicity of the ramp and the request could be done asynchronously.

For each new processing operation, the control interface reports the start of transmission (start of acquisition DACQ) and puts itself in a state of standby for the signal FACQ which therefore indicates the end of the need for data acquisition. The beginning of the processing operation is then prompted (by the signals DPSC and DCAL) and the providing of a spectrum is awaited (signals FCAL and FSPC) during the processing phase. The spectral analysis circuit works autonomously and, by means of a second signal DACQ, indicates the end of its period of acquisition of the signal.

What is claimed:

1. A method of spectral analysis, especially for a digital processing FM/CW type radio altimeter, comprising successive steps as follows:
   a) the frequency modulation of a transmission signal according to a law of variation in sawtooth form at a given recurrence frequency,
   b) the transmission of this modulated signal, and its reception after reflection and the mixing of the received signal with the transmitted signal so as to give a beat signal,
   c) the digitizing of this beat signal so as to give a succession of digital samples of signals delivered during the period of each sawtooth, and
   d) the performance of a spectral analysis of these samples in order to deliver a spectral information element, this spectral analysis comprising the following steps:
   e) the determining, at each sawtooth, of a series of local self-correlation coefficients enabling the definition of spectral components, on the basis of signal samples that are current, namely received during this same sawtooth,
   f) the determining of a series of global self-correlation coefficients by the computation of a weighted sum of the current local self-correlation coefficients and of the prior global self-correlation coefficients, computed during the previous sawteeth,
   g) the determining, from the global self-correlation coefficients, of a series of coefficients of a predictive polynomial by one of the two methods respectively known as the least error squares method and the Fourier transform,
   h) the restitution of the spectral components from the series of coefficients of a prediction polynomial thus determined.

2. A method according to claim 1 wherein, after the step f), the self-correlation coefficients are reset before the following iteration of this step.

3. A method according to claim 1 wherein, after the step f), the value of the global self-correlation coefficients is kept for the following iteration of this step.

4. A method according to claim 1, wherein the step b) is a step of continuous transmission in which the steps e) to g) are implemented permanently at the recurrence frequency of the sawteeth, the step h) is implemented systematically and a signal of availability of the result is delivered as soon this step h) is completed.

5. A method according to claim 1, wherein the step b) is a step of continuous transmission in which the steps e) to g) are implemented continuously at the recurrence frequency of the sawteeth and in which the step h) is implemented conditionally at the request of a user of the spectral information element.

6. A method according to claim 1, wherein the step b) is a step of discontinuous transmission implemented during a period limited to the time needed to complete the step h).

7. A method according to claim 1 wherein, during the step f), for each global self-correlation coefficient, the weighted sum associates, with each prior local self-correlation coefficient, a weighting factor which is a function of the rank of seniority of the prior local sample considered.

8. A method according to claim 1, wherein the weighting factor is an exponential parameter proportional to the periods of the sawteeth at the instant of processing.

* * * * *